July 14, 1959 I. K. DORTORT 2,895,099

VOLTAGE BALANCING FOR SERIES CONNECTED RECTIFIERS

Filed Dec. 10, 1956 2 Sheets-Sheet 1

INVENTOR.
ISADORE K. DORTORT

BY Ostrolenk, Faber, Gerb & Soffen

ATTORNEYS

July 14, 1959 I. K. DORTORT 2,895,099

VOLTAGE BALANCING FOR SERIES CONNECTED RECTIFIERS

Filed Dec. 10, 1956 2 Sheets-Sheet 2

INVENTOR.
ISADORE K. DORTORT
BY Ostrolenk, Faber, Gerb & Soffen
ATTORNEYS

United States Patent Office 2,895,099

Patented July 14, 1959

2,895,099

VOLTAGE BALANCING FOR SERIES CONNECTED RECTIFIERS

Isadore K. Dortort, Philadelphia, Pa., assignor to I-T-E Circuit Breaker Company, Philadelphia, Pa., a corporation of Pennsylvania Application December 10, 1956, Serial No. 627,469

13 Claims. (Cl. 321—11)

My invention relates to circuitry for equally distributing inverse voltage across series connected diodes of the semi-conductor or metallic type by providing means for controlling the potential at the junctions of each of the series connections.

It is to be noted that, by diode, I refer to any type of rectifying element which could include a transistor which has at least two elements for achieving rectification.

When using the above noted rectifying devices for voltage higher than the inverse voltage rating of a single diode, it is necessary to place a given number of these diodes in series with one another. It is, however, necessary to underrate the voltage rating of the diodes since the inverse voltage will not normally be equally distributed unless the diodes are substantially identical in their reverse characteristics. This is true since, in the series chain, reverse current at any instant is equal for each of the diodes, but since the reverse impedance of the diodes at this current is different, the voltage drop on the diode will be different.

Thus, if at a specified reverse current, one diode has a higher impedance than a second diode, the voltage drop across the first diode will be substantially higher than that across the second. In fact, it is possible that the inverse voltage across the first diode may be greater than its breakdown voltage, whereby damage or destruction of the diode will occur.

If, in order to avoid this condition, diodes are closely matched to one another, after an extended period of time, the diodes age and their reverse characteristics change so that one diode may then assume a greater proportion of the total inverse voltage.

For this reason, a considerable voltage derating has been necessary when connecting semi-conductor or metallic diodes in series with one another even though their characteristics are relatively closely matched.

As well as requiring derating of the diodes, the above-conditions make maintenance particularly difficult since when a single diode of a chain is to be replaced, its characteristics may be quite different from those remaining in the chain.

One method of attaining voltage balance between series connected diodes is set forth in copending application Serial No. 623,604, filed November 21, 1956, entitled Voltage Equalizer for Series Connected Rectifiers, to Edward J. Diebold, and assigned to the assignee of the instant invention, wherein an isolated voltage source connected in series with an auxiliary diode which may be very small, is connected across each of the main diodes. The auxiliary diode conducts current in the blocking direction of the main diode and accordingly, the main diode inverse voltage will be that given by the voltage of the auxiliary source regardless of the inverse voltage characteristics of the diode. It is further desirable within the above circuitry that resistor means be provided for preventing D.-C. load current flow through the auxiliary voltage source.

A fault sensing device may be located in the auxiliary circuitry since damage of any of the main diodes will be indicated by a sharp increase in the current drawn by the auxiliary circuits. This fault sensing means which may be of any of the well known types available could cause actuation of protective equipment such as circuit breakers or short circuiting devices to shut the unit down without any further damage to the other components.

This system presents some disadvantages, however, in the requirement for many components such as the auxiliary diode, resistor and auxiliary voltage source for each diode in the rectifier system. Furthermore, because of the presence of the current limiting resistors, the power available for the fault sensing and actuation of protective equipment is limited when a fault appears on one of the main diode units.

The principal object of my invention is to provide a novel means for assuring an equal distribution of inverse voltage across series connected semi-conductors or metallic diodes which requires a minimum number of auxiliary components, allows appreciable power for the operation of fault sensing and actuation of protective equipment, and allows a considerable degree of freedom in making phase connections.

More specifically, I provide a plurality of auxiliary inputs similar to the main power input of the rectifier system, and connect each of these inputs to junctions of adjacent connected rectifier cells so that the net voltage across any cell is determined only by the net potential difference between the two junctions, this potential difference being controlled by the potential difference of at least one of the auxiliary sources. The voltage magnitude of each of the inputs varies in accordance with the desired net voltage which is to appear across their respective diodes.

By way of example, if a first and second diode are connected in series to rectify a voltage having the magnitude E, then an auxiliary voltage having a magnitude one-half E would be applied at the junction between the first and second rectifier cell. This auxiliary voltage source, which could be a high impedance type, operates so that the voltage across the first diode is always ½ E while the voltage across the second diode is similarly always ½ E. The required inverse current for each diode is individually supplied by one of the two sources and no longer determines the inverse voltage assumed by the diodes.

Thus, even though the two diodes may have different inverse voltage characteristics, their inverse voltage will always be that value which is predetermined by adjusting the voltage of the auxiliary source.

If the series connection above noted comprised a first, second and third diode connected in series with a voltage E, then a first auxiliary voltage would be injected between the junction of the first and second diode, and would have a magnitude of ⅔ E while a second auxiliary voltage could be injected between the junction of the second and third diode having a magnitude of value ⅓ E, each of auxiliary sources being in phase with the source voltage E. The voltage across the first diode would therefore be the difference between E and ⅔ E, the voltage on the second diode would be the difference between ⅔ E and ⅓ E, while the voltage on the third diode would always be ⅓ E. Accordingly, each of the three diodes would see the identical voltage ⅓ E during their complete operation.

It is, however, to be noted that while the individual diodes in the above two examples are subjected to ½ or ⅓ respectively of the voltage of the main voltage source, the load which is being energized from an A.-C. source will see the same voltage that it would have seen in the absence of my novel voltage balancing system.

In using my novel system, therefore, it is no longer necessary that the individual diodes be matched to one another so far as their inverse voltage characteristics are concerned, since the inverse current of each of the cells at some predetermined voltage will be supplied by their respective auxiliary voltage source.

In the event of the failure of any of the diodes, the current supplied by the auxiliary source associated therewith will be appreciably increased since the damaged diode will now conduct in the reverse direction. This increase in current in the auxiliary circuit may then be utilized in any of many well known manners to operate protective equipment for preventing further damage to other diodes which would feed power into the damaged diode and thereby possibly damage the cells. Furthermore, sufficient power is available to operate protective devices although only one diode has failed.

It is to be noted that my novel invention accomplishes the above with the use of a limited number of components and further allows a considerable amount of power to be drawn from the auxiliary voltage sources on a fault of any of the diodes and further that any type of circuit connections is allowable.

Accordingly, a primary object of my invention is to provide a novel circuit for allowing the connection of a plurality of semi-conductor or metallic diodes in series with one another.

Another object of my invention is to provide means for connecting a first and second semi-conductor or metallic diode in series with one another and to equally distribute the inverse voltage between these two diodes regardless of their inverse voltage characteristic.

A further object of this invention is to provide an auxiliary voltage source for injecting a voltage at the junction of a first and second series connected diodes which is normally to appear across these diodes and is adjusted in magnitude to give a predetermined inverse voltage distribution across the diodes.

Still another object of my invention is to provide voltage means to control the potential at the junction between adjacent diodes in a plurality of series connected diodes so that the potential difference is some predetermined value, and the voltage means allow flow of any required inverse current for any diode.

A still further object of this invention is to provide a voltage equalizing circuit for series connected semi-conductors or metallic diodes wherein a predetermined inverse voltage appears across each of the individual diodes regardless of their inverse voltage characteristic and fault responsive means are energized by current conditions in the auxiliary circuit.

These and other objects of my invention will become apparent from the following description when taken in conjunction with the drawings, in which:

Figure 1 is a circuit diagram of a single phase full-wave rectifier system which illustrates the principles of my novel invention.

Figure 1*a* shows the circuit of Figure 1 when using three series connected rectifiers.

Figure 1:
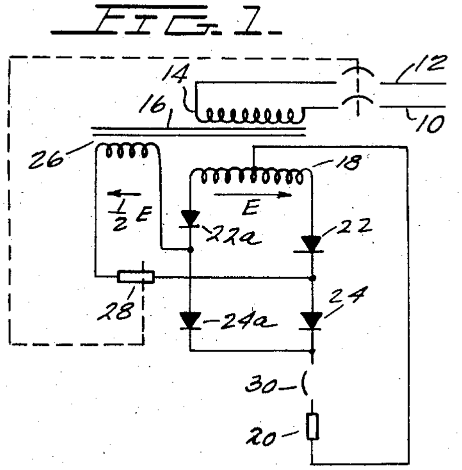

Referring now to Figure 1, a single phase A.-C. source comprising the lines 10 and 12 is connected to energize primary winding 14 of the main transformer 16. Secondary winding 18 is then connected to energize D.-C. load 20 through series connected diodes 22 and 24, and 22*a* and 24*a* respectively.

In considering the operation of the right hand branch, it is first assumed that each of the diodes 22 and 24 will have an inverse voltage rating which is at least ½ of the peak inverse voltage which is to appear across their corresponding branch.

Figure 2:
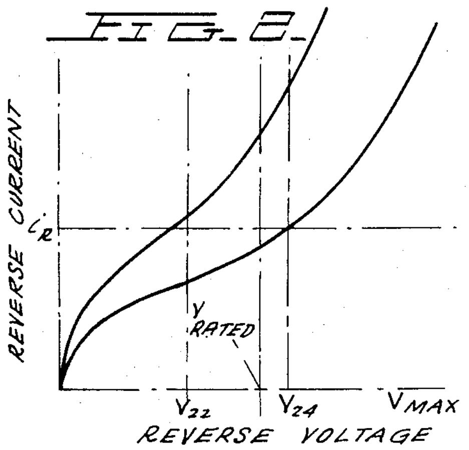
Figure 2 shows the inverse voltage characteristics of the rectifier cells of Figure 1.

During reverse voltage conditions, the reverse current as a function of reverse voltage for each of diodes 22 and 24 is shown in Figure 2. Since the diodes 22 and 24 are connected in series, the same reverse current flows therethrough, indicated as current $i_R$ in Figure 2. If, however, the diodes are mismatched in their reverse characteristics, it is seen in Figure 2 that the reverse voltage $V_{24}$ appearing across diode 24 would be substantially larger than the reverse voltage $V_{22}$ which appears across diode 22. Hence, if each diode is rated at $V_{rated}$ which is one-half of the maximum inverse voltage $V_{max}$ which appears across their branch, it is seen that the voltage $V_{24}$ appearing across diode 24 exceeds its rated voltage $V_{rated}$ and a break-down or damage of diode 24 will occur. It is for this reason that a substantial derating of series connected diodes has been necessary in the past, even though the voltage characteristics may be closely matched.

Furthermore, as time passes, the individual diodes age and their characteristics change so that while their characteristics may be substantially identical at first, after a period of operation, their characteristics may vary so with respect to one another that break-down of one of the diodes will occur due to the appearance of too large an inverse voltage thereacross.

In order to ensure equal voltage distribution between diodes 22 and 24, I provide an auxiliary winding 26, the impedance of which is substantially higher than that of load 20, which applies a voltage across diode 24 which is ½ of the voltage of secondary winding 18 and is in phase therewith. That is, the polarity of the auxiliary voltage applied to the rectifier system is in phase with the main voltage. Hence, when the right hand end of winding 18 becomes positive, the auxiliary voltage of transformer 16 applied to the right hand phase becomes positive. Accordingly, at any instant during the non-conducting period the voltage appearing across either of the diodes will assume the value ½ E as the voltage induced in winding 18 is the voltage E regardless of the inverse voltage characteristic of either of the diodes.

This is true since the inverse current through each of rectifiers 22 and 24 no longer needs to be identical as was true in the past since the auxiliary voltage source 26 now allows the inverse current of diode 24 to flow independently of the inverse current of diode 22.

That is to say, the inverse current of rectifier 22 flows in the circuit including winding 18, winding 26 and rectifier 22*a*, while the inverse current of the circuit including rectifier 24 flows in the circuit including winding 26, and rectifier 24*a*, the magnitude of the inverse current being determined only by the particular inverse voltage characteristic of each of diodes 22 or 24 at the voltage value ½ E.

In the event of a failure of either of the diodes 22 or 24, a substantial current will flow in its reverse direction and accordingly, a substantial current will be drawn from auxiliary voltage source 26. By connecting a fault sensing device 28, which may be of any desired type, in the auxiliary voltage circuit, this increase in current could be caused to operate circuit protective equipment such as the circuit breaker 30 and a breaker in the A.-C. side (as indicated by the dotted line) to remove the undamaged diodes from the line. Since no current limiting devices are necessary in the auxiliary circuit, the power available for operating fault sensing equipment is considerable and it is therefore possible to get high speed interruption responsive to the occurrence of a fault.

Figures 1A, 4, 6:
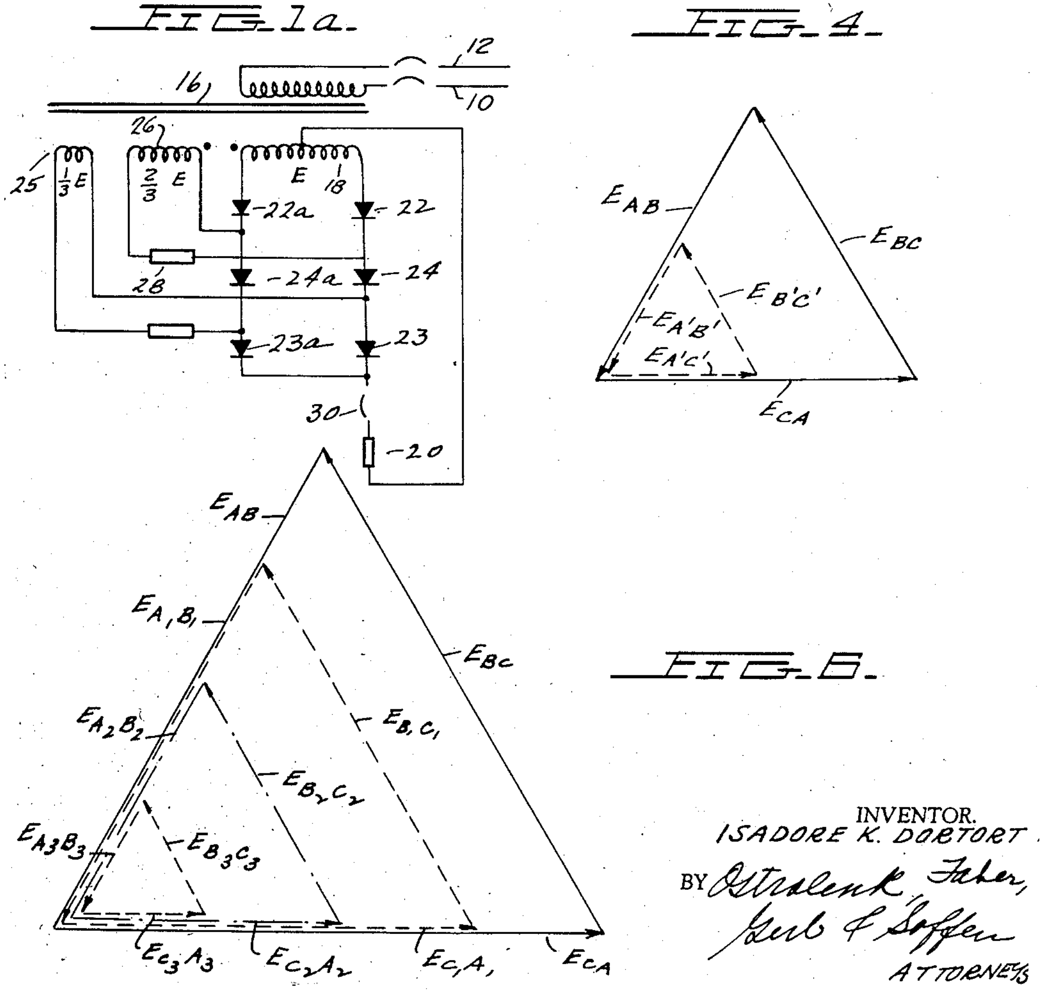
Figure 4 shows a vector diagram of voltage conditions within the circuit of Figure 3.
Figure 6 shows a vector diagram of the voltage conditions within the circuit of Figure 5.

If, as shown in Figure 1*a*, instead of the two series connected rectifiers of Figure 1, it is necessary to use three series connected rectifiers, the circuit may be modified by adding the third diodes 23 and 23*a* and a corresponding auxiliary voltage source.

Since three diodes, 22, 23 and 24 are now used in the branch under consideration, and assuming that it is desired to have ⅓ the line voltage appear across each, then the voltage of winding 26 will be ⅔ E while the voltage of winding 25 will be ⅓ E.

Application of simple circuit analysis to Figure 1*a* shows that diode 22 is subjected to the voltage difference of windings 18 and 26, rectifier 24 is subjected to the voltage difference of windings 26 and 25, while rectifier 23 assumes the voltage of winding 25. Accordingly, each diode is subjected to ⅓ of the voltage of the main voltage source 18, the individual reverse currents being supplied from individual circuits.

Figures 3, 5:
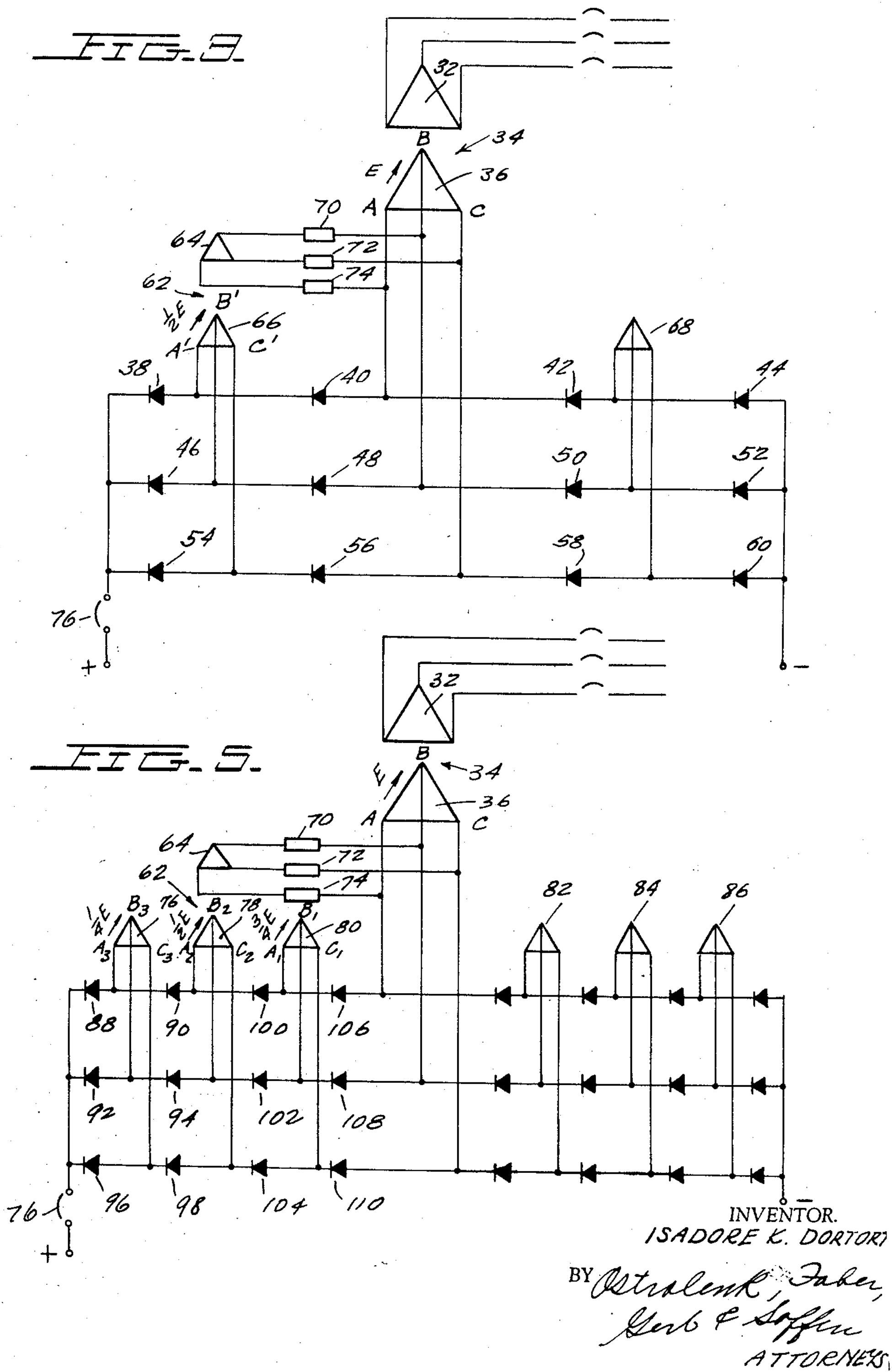
Figure 3 shows a circuit diagram of a three phase full wave rectifier system which is adapted in accordance with my novel invention.
Figure 5 shows the rectifier of Figure 3 with four diodes connected in series in each phase.

The application of my novel invention to a three phase rectifier system is shown in Figure 3 wherein a three phase line is connected to energize the primary windings 32 of a multiphase transformer 34. The secondary windings 36 of transformer 34 are then connected for three phase full wave rectification by means of diodes 38, 40, 42, and 44, for phase A; 46, 48, 50 and 52 for phase B; and 54, 56, 58 and 60 for phase C. The operation of transformer 34 and its associated rectifier of phases A, B, and C proceed in the manner well known in the art.

In order to ensure an equal voltage distribution across diodes 38—40, 42—44, 46—48, 50—52, 54—56, and 58—60, I provide an auxiliary transformer 62 comprising a primary winding 64 energized from secondary winding 36, the transformer 62 having two secondary windings 66 and 68. These two secondary windings 66 and 68 are auxiliary voltage means constructed to inject a voltage between the junctions of the above noted pairs of series connected diodes so as to assure an equal voltage distribution therebetween.

By way of example, point A′ of secondary winding 66 is connected to the junction between diodes 38 and 40, point B′ is connected between the junction of diodes 46 and 48, and point C′ is connected between the junction of diodes 54 and 56.

In a similar manner, secondary winding 68 injects a voltage between diode pairs 42—44, 50—52 and 58—60. The voltage appearing on secondary winding 66 as compared to the voltage of the main transformer winding 36 is shown in Figure 4 for conduction of diodes 38 and 40, which shows the voltages $E_{AB}$, $E_{CA}$, and $E_{BC}$ of secondary winding 36 as compared to the voltages $E_{A'B'}$, $E_{A'C'}$ and $E_{B'C'}$ of secondary winding 66.

Clearly the same vector diagram would obtain when comparing the phase voltages of secondary winding 68 to secondary winding 36.

It is seen in Figure 4 that since equal voltage distribution is desired between the various diode pairs, the magnitude of the voltages appearing across secondary winding 66 is ½ of the magnitude of the voltages of secondary winding 36.

This is true since the secondary windings 66 and 68 serve to isolate their respective series connected diodes in so far as flow of inverse current is concerned and supply whatever inverse current is required for each individual diode for the predetermined inverse voltage appearing across that diode.

In order to provide rapid disconnection or protection of the rectifying system responsive to the failure of any one of its component diodes, fault sensing devices of any well known type may be provided in series with the primary winding 64 and are indicated as the fault sensing devices 70, 72 and 74. Thus, in the event of a failure of any of the diodes of the circuit of Figure 3, either secondary winding 66 or secondary winding 68 will see an increased current flow. This increase will be reflected into the primary winding 64 and therefore one of the devices 70, 72 or 74 will be energized, even though only one element of a series has failed.

By way of example, if rectifier 38 were faulted in some manner, a short circuit current would appear in winding A′B′ or A′C′ or both of secondary winding 66 and will cause an increase in current flow through fault sensing means 74 and 70, or 72, or all three. Fault sensing means 74 as well as fault sensing devices 72 and 70 in turn can be connected to cause operation of an A.-C. circuit breaker and of the D.-C. circuit breaker 76.

While Figure 3 shows my novel circuit applied to a condition where only two diodes are connected in series for each phase, Figure 5 shows the manner in which my circuit may be extended to any number of series connected diodes. Referring now to Figure 5, which is merely an extension of Figure 3, wherein four diodes per arm are used instead of two, similar numerals identify components similar to those of Figure 3. Here, however, instead of the two secondary windings 66 and 68 as used in the circuit of Figure 3, the auxiliary transformer 62 has six secondary windings 76, 78, 80, 82, 84 and 86. Secondary winding 76 injects a voltage between diodes 88 and 90, 92 and 94, and 96 and 98. Secondary winding 78 injects a voltage between diodes 90 and 100, 94 and 102, and 98 and 104. Secondary winding 80 injects a voltage between diodes 100 and 106, 102 and 108, and 104 and 110. In a similar manner, secondary windings 82, 84 and 86 inject similar voltages between the series connected diodes on the negative side of the rectifier system.

The operation of this system which is substantially identical with that seen in Figure 4 may be understood with reference to the voltage vector diagram of Figure 6 which shows conditions during conduction of diodes 88, 90, 100 and 106, wherein the voltages $E_{AB}$, $E_{BC}$ and $E_{CA}$ are the voltages of the main secondary winding 36, while voltages $E_{A_1B_1}$, $E_{B_1C_1}$ and $E_{C_1A_1}$ correspond to winding 80, voltages $E_{A_2B_2}$, $E_{B_2C_2}$ and $E_{C_2A_2}$ correspond to winding 78, and voltages $E_{A_3B_3}$, $E_{B_3C_3}$ and $E_{C_3A_3}$ correspond to winding 76. The voltage magnitude of winding 80 is ¾ of the voltage of winding 36, the voltage of winding 78 is ½ that of the winding 36, and the voltage of winding 76 is ¼ that of winding 36.

Accordingly, the voltage appearing on diodes 106, 108 and 110 will be the main voltage less ¾ of its value or ¼ of the full voltage of transformer winding 36. The voltage on diodes 100, 102 and 104 will be ¾ of the main voltage minus ½ of the main voltage or again ¼ of the main voltage and in a similar manner the voltage on diodes 90, 94, 98, 88, 92 and 96 will be ¼ of the value of the main transformer winding.

Accordingly, in each of the series arms of the rectifier system, the inverse voltage is equally distributed and the inverse current requirements of each of the individual diodes is supplied by its own individual voltage source.

Clearly, the same voltage conditions would obtain for the diodes energized by the auxiliary voltage sources 82, 84 and 86.

In the event of a fault, the reversal of current through the faulted diode would cause a relatively large current drain on its associated secondary winding, this current increase being reflected in primary winding 64 to thereby subsequently operate one or more of fault sensing devices 70, 72 or 74, which in turn would cause operation of A.-C. circuit breakers such as breakers 101 or any other desired type of circuit protective equipment.

It is to be noted at this point that my novel voltage equalizer circuit comprises only a single auxiliary transformer having the primary winding 64, and secondary windings 76, 78, 80, 82, 84 and 86. At the same time, there is ample power available in the auxiliary operating circuits for rapid energization of any of the fault sensing devices 70, 72 and 74.

With careful design and balancing of the impedances of the individual winding of the multiple-winding auxiliary transformer, the voltage redistribution across the remaining cells when one has failed, will be uniform, so that failure of additional cells before the protective devices operate, will be less probable.

Furthermore, my novel system allows means for anticipating a failure of one of the diodes being used. That is, by constructing sensing devices 70, 72 or 74 of Figure 3 or 5 to operate responsive to an increase in reverse current beyond a predetermined value, the presence of a bad cell which is not yet completely shorted may be indicated. In this case, the indication could be a perceivable one such as a warning light, or buzzer, whereas only short circuiting of the cell could energize the protective equipment.

Note that the auxiliary transformer can be broken up into as many separate transformers as may be desired and the connection can be of any form, such as Y—Y, so long as its terminal voltages are properly related in phase and magnitude to the terminal voltages of the main transformer.

Although I have described preferred embodiments of my novel invention, many modifications and variations will now be obvious to those skilled in the art, and I therefore prefer to be limited not by the specific disclosure herein, but only by the appended claims.

I claim:

1. An electrical circuit for allowing predetermined distribution of inverse voltage between a first and second series connected diode; first and second series connected diodes being connected in series with a first A.-C. source; said electrical circuit comprising an auxiliary voltage source connected to pass inverse current through said second diode and having one terminal connected at the junction between said first and second diode and its other terminal connected at a point with respect to said second diode to complete a circuit therethrough for conduction of said inverse current.

2. An electrical circuit for allowing predetermined distribution of inverse voltage between a first and second series connected diode; first and second series connected diodes being connected in series with a first A.-C. source; said electrical circuit comprising an auxiliary voltage source connected to pass inverse current through said second diode and having one terminal connected at the junction between said first and second diode and its other terminal connected at a point with respect to said second diode to complete a circuit therethrough for conduction of said inverse current; said auxiliary voltage source being connected to impress a voltage across said second diode having a magnitude equal to the voltage of said first A.-C. source minus the voltage desired to appear across said second diode; the voltage induced across said first diode being one-half the value of the voltage of said first voltage source.

3. An electrical circuit for allowing predetermined distribution of inverse voltage between a first and second series connected diode; first and second series connected diodes being connected in series with a first A.-C. source; said electrical circuit comprising an auxiliary voltage source connected to pass inverse current through said second diode and having one terminal connected at the junction between said first and second diode and its other terminal connected at a point with respect to said second diode to complete a circuit therethrough for conduction of said inverse current; the magnitude of said auxiliary voltage source being the difference between the voltage of said first A.-C. source and the voltage to appear across said second diode; and fault sensing means connected in said electrical circuit; said fault sensing means being operated responsive to an increase in current through said electrical circuit due to failure of one of said diodes; said fault sensing means operating protective equipment responsive to operation thereof.

4. An electrical circuit for allowing predetermined distribution of inverse voltage between a plurality of diodes connected in series with one another; said electrical circuit comprising a plurality of voltage sources, one terminal of each of said voltage sources being connected to a respective junction between adjacently connected diodes of said plurality of diodes, the other terminal of said plurality of voltage sources being connected to allow passage of inverse current through each of said diodes by their said respective voltage sources, the voltages of said plurality of voltage sources differing from one another by predetermined amounts, the voltage difference between the voltages impressed on the two junctions of any of said diodes determining the inverse voltage appearing thereacross.

5. An electrical circuit for allowing predetermined distribution of inverse voltage between a plurality of diodes connected in series with one another regardless of their relative inverse voltage characteristics; said circuit comprising a plurality of voltage sources each being connected to pass inverse current through a respective diode of said plurality of diodes; at least one of said plurality of voltage sources being connected to complete a path through at least two adjacent diodes of said plurality of diodes; the voltages of said plurality of voltage sources connected across adjacent diodes being in phase with one another, the magnitude of voltage of said voltage sources differing from one another by the voltage which is to appear on their common diode.

6. An electrical circuit for allowing predetermined distribution of inverse voltage between a plurality of diodes connected in series with one another regardless of their relative inverse voltage characteristics; said circuit comprising a plurality of voltage sources; at least one of said plurality of voltage sources being connected to complete a path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode; and fault sensing means connected in said electrical circuit; said fault sensing means being energized by failure of one of said diodes, said fault sensing means being constructed to operate protective equipment responsive to energization thereof.

7. In a rectifier system comprising a plurality of diodes connected in series with one another for energizing a D.-C. load from an A.-C. source, electrical circuitry for maintaining a predetermined inverse voltage distribution between each of said diodes of said plurality of diodes; said electrical circuitry comprising a plurality of voltage sources for respectively impressing a predetermined voltage across a respective diode of said plurality of diodes; at least one of said plurality of voltage sources being connected to complete a current path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode.

8. In a rectifier system comprising a plurality of diodes connected in series with one another for energizing a D.-C. load from an A.-C. source; electrical circuitry for maintaining a predetermined inverse voltage distribution between each of said rectifiers of said plurality of diodes; said electrical circuitry comprising a plurality of voltage sources, one terminal of each of said voltage sources being connected to a respective junction between adjacently connected diodes of said plurality of diodes, the other terminal of said plurality of voltage sources being connected to complete a path for inverse current for each respective diode; the voltage difference between the voltages impressed on the two junctions of any of said diodes determining the inverse voltage appearing thereacross.

9. In a multiphase rectifier system comprising a plurality of diodes connected in series with one another in each phase; electrical circuitry for each phase for maintaining a predetermined inverse voltage distribution between each of said series connected diodes of each respective phase; said electrical circuitry for each phase comprising a plurality of voltage sources, and the main voltage source of said rectifier system, one terminal of each of said voltage sources being connected to a respective junction between adjacently connected diodes, the other terminal of said plurality of voltage sources being connected to complete a path for inverse current for each respective diode; the voltage difference between the voltages impressed on the two junctions of any of said diodes determining the inverse voltage appearing thereacross.

10. In a multiphase rectifier system comprising a plurality of diodes connected in series with one another in each phase; electrical circuitry for each phase for maintaining a predetermined inverse voltage distribution between each of said series connected diodes of each respective phase; said electrical circuitry for each phase comprising a plurality of voltage sources, and the main voltage source of said rectifier system, one terminal of each of said voltage sources being connected to a respective junction between adjacently connected diodes, the other terminal of said plurality of voltage sources being connected to complete a path for inverse current flow for each respective diode; the voltage difference between the voltages impressed on the two junctions of any of said diodes determining the inverse voltage appearing thereacross; and fault sensing means connected in said electrical circuit; said fault sensing means being energized by failure of one of said diodes, said fault sensing means being constructed to operate protective equipment responsive to energization thereof.

11. In a multiphase rectifier system comprising a plurality of diodes connected in series with one another in each phase, electrical circuitry for each phase for maintaining a predetermined inverse voltage distribution between each of said series connected diodes of each respective phase; said electrical circuitry for each phase comprising a plurality of voltage sources; at least one of said plurality of voltage sources being connected to complete a path through at least two adjacent diodes of said plurality of diodes; the voltages of said plurality of voltage sources connected across adjacent rectifiers being in phase with one another; the magnitude of voltage of said voltage sources differing from one another by the voltage which is to appear on their common diode.

12. An electrical circuit for allowing predetermined distribution of inverse voltage between a plurality of diodes connected in series with one another regardless of their relative inverse voltage characteristics; said circuit comprising a plurality of voltage sources; at least one of said plurality of voltage sources being connected to complete a path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode; and fault sensing means connected in said electrical circuit; said fault sensing means being energized by an increase in inverse current beyond a predetermined value of one of said diodes, said fault sensing means being constructed to indicate the presence of said diode carrying said increased inverse current.

13. An electrical circuit for allowing predetermined distribution of inverse voltage between a plurality of diodes connected in series with one another regardless of their relative inverse voltage characteristics; said circuit comprising a plurality of voltage sources; at least one of said plurality of voltage sources being connected to complete a path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode; and fault sensing means connected in said electrical circuit; said fault sensing means being energized by failure of one of said diodes, said fault sensing means being constructed to operate protective equipment responsive to energization thereof; the voltage across said series connected diodes being substantially equally redistributed after said failure of said last mentioned diode.

No references cited.